Feb. 10, 1953 — J. W. SMITH — 2,628,076
AIR-CONDITIONING CONTROL SYSTEM
Filed Jan. 22, 1949 — 2 SHEETS—SHEET 1

FIG. 1

INVENTOR.
JAMES W. SMITH
BY
George H. Fisher
ATTORNEY

Feb. 10, 1953

J. W. SMITH 2,628,076

AIR-CONDITIONING CONTROL SYSTEM

Filed Jan. 22, 1949

INVENTOR.
JAMES W. SMITH

BY

George H. Fisher

ATTORNEY

Patented Feb. 10, 1953

2,628,076

UNITED STATES PATENT OFFICE 2,628,076

AIR-CONDITIONING CONTROL SYSTEM

James W. Smith, Minneapolis, Minn., assignor to Minneapolis-Honeywell Regulator Company, Minneapolis, Minn., a corporation of Delaware Application January 22, 1949, Serial No. 72,243

18 Claims. (Cl. 257—3)

The present invention relates to an air conditioning control system operable on either a heating or cooling sequence and properly compensated for either sequence.

In air conditioning, it is frequently desirable to control a heating system and a cooling system in sequence to hold the space temperature within desired limits and, to keep these limits within the desired limits, compensation is required. Also, in many instances, it is desirable to vary the control point of a space thermostat in a predetermined manner, compensation also being necessary for this. However, proper compensation for a cooling system is generally in an opposite direction from that needed for a heating system and is often different in amount. It is thus a principal object of this invention to provide a control system for both a heating system and a cooling system wherein proper compensation is provided at all times.

It is an additional object to provide a control system for both heating and cooling wherein the control point or throttling ranges may overlap or may be spaced apart a desired amount but wherein the compensation remains correct.

An additional object, similar to that above, is the provision of a control system for both heating and cooling wherein the throttling ranges or control points may overlap but wherein both heating and cooling are provided at the same time when necessary for humidity control.

It is a further object to provide control apparatus for an air conditioning system compensated for variations in outside temperature and also compensated for additional cooling of the circulating air during operating conditions involving humidity control.

It is also an object to provide a control apparatus comprising a network circuit having a plurality of outputs for controlling a plurality of devices and having a convenient and effective capacity balance arrangement for adjusting the network to a null point.

It is an additional object to provide a switching arrangement in a control system which positively provides the correct compensation for the system at all times.

It is another object to provide an improved automatic air conditioning control system operable on a heating sequence, cooling sequence or a humidity control sequence.

These and other objects will appear upon a study of the following specification and drawings wherein.

Figure 1:
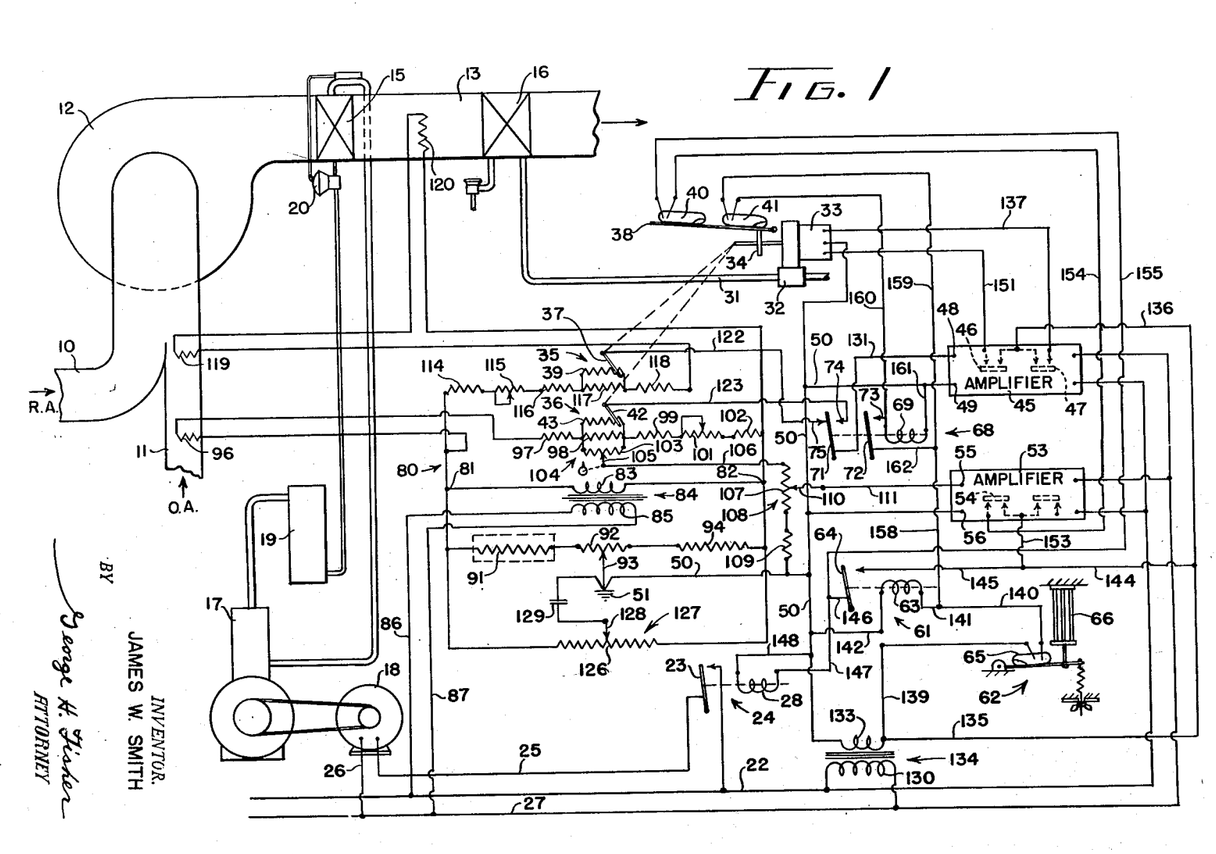
Figure 1 is a schematic representation of one form of the present invention.

The air conditioning system shown in Figure 1 of the drawing is rather conventional and comprises a return air inlet 10, a fresh air inlet 11, a blower 12 and a discharge conduit 13. A cooling coil or evaporator 15 and a steam coil or heater 16 are located in conduit 13 and are arranged to temper the air passing through said conduit.

Evaporator 15 is supplied with refrigerant by a compressor 17 driven by an electric motor 18, the refrigerant being pumped by the compressor through a condenser 19, a thermostatic expansion valve 20, coil 15 and back to the compressor. Motor 18 is energized by the circuit: line wire 22, switch 23 of relay 24, wire 25, motor 18, wire 26 and line wire 27. The energization of winding 28 of relay 24 will be described later as a function of the present control system.

Heating coil 16 is supplied with steam through a pipe 31, under control of a motorized valve 32, from a suitable source, not shown. Valve 32 is driven by a conventional, geared, two-phase reversible motor 33, motor 33 also driving a cam 34 and a pair of follow-up potentiometers 35 and 36. Cam 34 serves to position a pivoted lever 38 having mounted thereon a pair of mercury switches 40 and 41, the cam being so arranged that both switches 40 and 41 close their contacts when valve 32 is fully closed, the valve being slightly open as shown, and the contacts are open at all other positions of said valve. Motor 33 simultaneously positions wiper 37 to the extreme right of resistor 39 of follow-up potentiometer 35 and wiper 42 to the extreme right of resistor 43 of follow-up potentiometer 36, slightly beyond the position shown, when the valve is closed, the wipers 37 and 42 being driven to the left extreme of resistors 39 and 43, respectively, as the valve is opened.

Motor 33 is controlled by a discriminator type amplifier 45 including a pair of relays 46 and 47, one of the relays being operated when an input signal of one phase is impressed on input terminal 48 and the other relay being operated with an input signal of opposite phase is impressed on said input terminal, the other input terminal 49 of the amplifier being connected through wire 50 to ground 51. While any conventional discriminator type relay or amplifier device may be used, an electronic amplifier such as described in Upton Patent No. 2,423,534, issued July 8, 1947, has been found quite satisfactory.

Relay 24 is normally controlled by an amplifier 53 including a relay 54 and having an input terminal 55 and a grounded input terminal 56, this amplifier being similar to 45. Relay 24 may also be operated by relay 61 controlled by humidistat 62, relay 61 having a winding 63 and a switch 64. Humidistat 62 includes a mercury switch 65 operated by a moisture sensitive hair element 66, switch 65 being closed when the relative humidity exceeds a predetermined value for which device 62 is set.

Humidistat 62 also cooperates with mercury switch 41 to control relay 68, this relay including a winding 69 and a pair of switch blades 71 and 72. Switch blade 72 coacts with "in" contact 73 and switch blade 71 coacts with "in" contact 74 and "out" contact 75, blade 72 and contact 73 controlling a holding circuit for the relay 68 and blade 71 and its contacts determining whether amplifier 45 is being controlled in a normal heating sequence or a reheat sequence.

Amplifiers 45 and 53 are controlled by an electrical network circuit generally identified by the numeral 80, circuit 80 having input terminals 81 and 82 energized from secondary winding 83 of transformer 84, primary winding 85 of this transformer being connected to line wires 22 and 27 by wires 86 and 87, respectively. Network 80 includes a plurality of parallel branches, the first branch comprising a temperature responsive resistor 91 used as a room thermostat, a calibrating potentiometer having a resistor 92 and a wiper 93 connected to ground 51, and a fixed resistor 94, this branch being connected across terminals or sides 81 and 82 of the network. A cooling branch of the network comprises an outside compensator which is a temperature responsive resistor 96, a fixed resistor 97, a fixed resistor 98, a fixed resistor 99, a variable resistor 101 and a fixed resistor 102, this branch also being connected across input terminals or sides 81 and 82 and in parallel with the aforementioned branch. Resistor 43 of follow-up potentiometer 36 is connected in parallel with resistor 98, and resistor 103 of manually adjusted potentiometer 104 is also connected in parallel with resistor 98. Wiper 105 of potentiometer 104 is connected through wire 106, resistor 107 of a high resistance potentiometer 108, fixed resistor 109, and wire 50 to ground 51. Wiper 110 of potentiometer 108 is connected by wire 111 to input terminal 55 of amplifier 53.

The heat control branch of network 80 comprises, reading from input terminal or side 81, fixed resistor 114, variable resistor 115, fixed resistor 116, fixed resistor 117 connected in parallel with resistor 39 of follow-up potentiometer 35, fixed resistor 118, outside compensator, or temperature responsive resistor 119, discharge compensator 120, likewise formed of material having a relatively high temperature coefficient of resistance, and the opposite input terminal or side 82 of the network. Wiper 37 of follow-up potentiometer 35 is connected by wire 122 to "out" contact 75 of relay 68 and wiper 42 of follow-up potentiometer 36 is connected by wire 123 to "in" contact 74 of said relay. Wiper 93, connected to ground 51, comprises one output terminal of network 80 and wiper 37 of follow-up potentiometer 35 comprises the other output terminal of the network when on a normal heating cycle. Wiper 42 of follow-up potentiometer 36 comprises the ungrounded output terminal of the network circuit when on a reheating cycle, and wiper 105 of manually adjusted potentiometer 104 comprises the output terminal for the cooling branch of the network circuit, with potentiometer 108 being interposed between wiper 105 and amplifier 53 as a sensitivity control for adjusting the intensity of the signal that can be imposed on amplifier 53 by a predetermined unbalance in network 80.

In addition to the above parallel branches of network 80, resistor 126 of potentiometer 127 is connected across the input terminals 81 and 82, resistor 126 being of relatively high value. Wiper 128 of this potentiometer is connected through capacitor 129 to ground 51, the adjustment of wiper 128 across resistor 126 serving to alter the capacity balance of the bridge network and is used to establish an optimum condition of balance in the network upon installation, this optimum condition of balance being determined by adjusting the various calibrating potentiometers in the network proper to obtain minimum signals and then further adjusting wiper 128 to reduce these minimum signals to the lowest possible value. This adjustment is usually made upon installation and seldom needs repeating thereafter and is an effective and simple way to balance the capacity effects of the bridge due to long leads and the like for remote devices such as the previously mentioned compensators.

As an example of resistance and capacity values found useful in the present network circuit the following table of values is submitted. Obviously these values are for illustration only.

*Table*

| Resistor | Ohms | Resistor | Ohms |
| --- | --- | --- | --- |
| 91 | 1,000 | 109 | 1,000 |
| 92 | 30 | 114 | 164 |
| 94 | 1,000 | 115 | 30 |
| 96 | 450 | 116 | 985 |
| 97 | 1,000 | 117 | 6,24 |
| 98 | 6.65 | 39 | 135 |
| 43 | 135 | 118 | 1,000 |
| 103 | 100 | 119 | 114 |
| 99 | 985 | 120 | 40 |
| 101 | 30 | 126 | 50,000 |
| 102 | 450 | Capacitor | Mfd. |
| 107 | 10,000 | 129 | .03 |

Primary winding 130 of transformer 124 and amplifier 45 and 53 are connected to line wires 22 and 27, as shown. To better show the function of the present control system, its operation will now be discussed.

*Operation*

With the apparatus arranged as shown and in operation, a blower 12 is inducing a flow of return air through inlet 10 and a flow of fresh air through outside air inlet 11 and is discharging the air through coils 15 and 16 into the distribution portion of the air conditioning system, not shown. As switch 23 of relay 24 is open, the refrigerating apparatus is not being operated hence there is no cooling due to coil 15. However, steam valve 32 is slightly open, hence there is a small amount of heat being furnished by coil 16. Assuming that network 80 is so adjusted that the desired room temperature is 70° when the outside temperature is 70° and that the room temperature may be permitted to increase to 80° when the outside temperature rises to 100° and that the room temperature may rise to 74° when the outside temperature is 0°, it may now be further assumed that the apparatus is now operating at an outside temperature of about 65°. If the outside temperature should now drop below 65°, it seems obvious that compensators 119 and 120 will both reflect the lower temperature by lowering their resistance, thus unbalancing network 80 and causing a signal to be impressed on input terminal 48 of amplifier 45 through wiper 37, wire 122, contact 75, wiper 71, wire 131 and input terminal 48. As previously mentioned, a signal impressed on input terminal 48 of amplifier 45 causes one or the other of relays 46 and 47 to be operated, the phase of the input signal determining which of the relays will be pulled in. Rather than discuss the present network in terms of phase relation, however, it is more convenient to discuss this network in terms of potentials at a half cycle instant, it being obvious that the potentials will be reversed at the next half cycle instant and that like potentials will indicate, in the actual circuit, like phase relations, whereas opposite potentials at the instant in question will indicate reverse phases. With this assumption, let it now be assumed that at the half cycle instant in question, input terminal or side 81 of network 80 is positive and input terminal or side 82 of the network is negative and further assume that a positive signal at amplifier input terminal 48 causes operation of relay 46 to drive motor 33 in a valve closing direction and a negative signal at terminal 48 causes operation of relay 47 to energize motor 33 in a valve opening direction. With a decrease in outside temperature and a consequent lowering of the resistance of compensators 119 and 120, it seems obvious that wiper 37 will become more negative relative to ground 51 than previously, hence a negative signal is impressed on terminal 48 by the aforementioned circuit. This causes relay 47 to close its contacts and thus energize motor 33 by the circuit: transformer secondary winding 133 of transformer 134, wire 135, wire 136, relay 47, wire 137, motor 33 and ground wire 50. As before mentioned, energization of motor 33 in this manner causes it to operate in a direction to open valve 32. As valve 32 is opened, additional steam is supplied coil 16 to furnish heat to offset the decrease in outside temperature. In addition, cam 34 is operated in a direction to further raise pivoted lever 38, hence switches 40 and 41 remain open. In addition, wipers 37 and 42 are adjusted to the left across their respective resistors, wiper 37 tending to become less negative as it is advanced to the left across resistor 39. When the additional negative signal caused by the cooling of resistors 119 and 120 is rebalanced by the leftward movement of wiper 37, the negative signal impressed on amplifier terminal 48 is eliminated and equilibrium is again achieved with valve 32 being slightly more open than before. If the additional opening of valve 32 was not enough to counteract the effect of the fall in outside temperature and the room temperature also diminishes, thereby diminishing the resistance of resistor 91, it appears that this decrease in resistance causes terminal or side 81 to be less positive relative to ground than it previously was, hence the decreased positive potential of the left side of the network results in wiper 37 again becoming negative relative to ground 51 hence relay 47 is again energized and drives motor 33 in a further valve opening direction until additional leftward movement of wiper 37 again rebalances the network and wipes out the negative signal, thus deenergizing relay 47 and stopping further movement of the motor.

With the system now in equilibrium and with additional heat being supplied, it may now be considered that the relative humidity in the space being treated increases beyond the desired amount. An increase in relative humidity causes an elongation of the hair element 66 thus permitting a clockwise movement of pivoted switch 65 and a closing of its contacts. This causes energization of relay 61 by the circuit: secondary winding 133, wire 139, switch 65, wire 140, wire 141, winding 63 of relay 61, and wire 142 to ground wire 50. Relay 61 then causes energization of relay 24 by the circuit: secondary winding 133, wire 135, wire 144, wire 145, switch 64 of relay 61, wire 146, wire 147, winding 28 of relay 24 and wire 148 to ground wire 50. As previously mentioned, the energizing of relay 24 causes operation of the refrigerating system by a circuit previously traced. Operation of the refrigerating system causes cooling at coil 15 thus tending to condense out moisture in the air being delivered through the coil. In addition, the cooling due to coil 15 causes a reduction in temperature of the air effecting compensator 120 hence the lowered resistance of this compensator causes wiper 37 to again become negative relative to ground thereby impressing a negative signal on terminal 48 of amplifier 45 and causing energization of relay 47 and a further opening of steam valve 32 to counteract the effect of the cooling due to coil 15. Upon the relative humidity in the space being treated decreasing below the value for which humidistat 62 is set, and thereby causing a contraction of hair element 66 and an opening of the contacts of switch 65, relay 61 is deenergized as is relay 24, thereby stopping the refrigerating system. Normal heating then continues, with valve 32 being slightly closed as compensator 120 comes up to outside air temperature.

If the outside temperature should now rise, resistors 119 and 120 increase in temperature and resistance and thereby tend to make wiper 37 positive relative to ground and cause a positive signal to be impressed on terminal 48 by the aforementioned circuit. This causes an energization of relay 46 and the energization of motor 33 by the circuit: secondary winding 133, wire 135, wire 136, relay 46, wire 151, motor 33 and ground wire 50. This causes motor 33 to drive valve 32 in a closing direction and also causes a rebalancing of the network by driving wiper 37 to the right across resistor 39. Obviously, the increase in outside temperature will also tend to cause an increase on the inside temperature and the increase in temperature of resistor 91 causes it to increase in resistance and thereby tends to increase the positive potential of the left side of the network, thereby tending to make wiper 37 positive with respect to ground 51 and again causing a positive signal to be impressed on terminal 48, with a consequent further closing of valve 32. In the discussion thus far, it has been noted that a decrease in space temperature causes an opening of valve 32 and that a decrease in outside temperature causes an additional opening of valve 32 due to compensators 119 and 120, and the effect on this compensation over the range of temperatures involved during the heating season is to increase the space temperature by the desired amount as the outside temperature falls, to thereby compensate for decreases in wall temperature, and other factors tending to require an increase in room temperature for comfort. Obviously, as the room temperature increases, the steam valve is driven in a closing direction and, as the outside temperature increases, the valve is driven in a further closing direction because of the lowering of the control point for the space. However, should compensation in this direction be continued through a cooling cycle so that the control point for the space temperature would continue to diminish as the outside temperature increased, it seems obvious that a relatively low space temperature would be required when the outside temperature is quite high. This is obviously contrary to the requirements for a good air conditioning system hence the compensation for the cooling system must be different from that described above.

With the increase in outside temperature and the consequent increase in space temperature, we may now consider that valve 32 has been driven to a completely closed position by motor 33, wipers 37 and 42 are at the extreme right of their respective resistors and cam 34 has now advanced sufficiently to lower pivoted arm 38 sufficiently to close the contacts of switches 40 and 41.

While on the heating cycle, amplifier 53 has also been energized and, because the compensated cooling control point for the network is below the space temperature, due to the relatively low outside temperature, relay 54 is pulled in, but because the contacts of switch 40 are open, relay 24 can not be energized by the amplifier 53, hence there has been no cooling.

With the space temperature at about 70°, the established control point for the space, and with the outside temperature somewhat above 70°, it appears obvious that the left side of network 80 is at a relatively high positive potential relative to ground 51.

Because of the relatively high temperature of compensators 119 and 120, wiper 37 is positive relative to ground, hence relay 46 of amplifier 45 remains energized to keep valve 32 closed. Also, due to the relatively high resistance of compensator 96, the increase in resistance of 91 is offset by the increase in resistance of 96 hence wiper 105 is at substantially ground potential and there is no output signal from the network for operating amplifier 53. Amplifier 53 is operative in the same manner as amplifier 45 with relay 54 being closed when a positive signal is impressed on input terminal 55 of the amplifier.

Assuming that the space temperature rises still further, this tends to make wiper 105 positive relative to ground and the resulting signal impressed on terminal 55 through wire 106, resistor 107, wiper 110 and wire 111 to terminal 55 causes energization of relay 24 by the circuit: secondary winding 133, wire 135, wire 144, wire 153, relay 54, wire 154, switch 40, wire 155, wire 147, winding 28, and wire 148 to ground wire 50. Energization of relay 24 starts motor 18 and compressor 17 by a circuit previously traced and thereby causes cooling of the air discharged through conduit 13. If the outside temperature should now rise considerably without a corresponding increase in room temperature, it appears that wiper 105 will then tend to become negative relative to ground and a negative signal thus impressed on terminal 55. No signal or a negative signal impressed on terminal 55 will, of course, cause a deenergization of relay 54 and a stopping of the refrigerating system, thus permitting an increase in the space temperature as the outside temperature rises due to the compensating effect of resistor 96. However, if the outside air temperature should fall rather than rise, or if the space temperature should be relatively high, wiper 105 then again becomes positive relative to ground, relay 54 is again actuated and the refrigerating apparatus is operated.

If the relative humidity in the space being treated should now increase above the desired value, with a consequent closing of the contacts of switch 65, relay 68 is energized by the circuit: secondary winding 133, wire 139, switch 65, wire 140, wire 158, wire 159, switch 41, wire 160, winding 69, wire 161 and ground wire 50. Energization of winding 69 pulls switch blades 71 and 72 into engagement with "in" contacts 74 and 73, respectively and this establishes a holding circuit for the relay by shunting switch 41 through wire 162, blade 72 and contact 73, hence relay 68 will then remain energized so long as switch 65 is closed, even if switch 41 is opened due to opening of valve 32.

The engagement of wiper 71 with "in" contact 74 connects rebalance potentiometer 36 to amplifier 45 by the circuit: wiper 42, wire 123, contact 74, blade 71, wire 131 and input terminal 78 of amplifier 45. Due to the extreme right position of wiper 42 on resistor 43, said wiper tends to be negative relative to ground 51 and, as a negative signal on input terminal 48 of amplifier 45 has been described as causing energization of relay 47, the consequent opening of steam valve 32 causes heat to be supplied to the air after its cooling by coil 15. Then, as valve 32 is opened, wiper 42 is advanced to the left across resistor 43 to rebalance the network. However, the rebalancing caused by wiper 42 has no effect on the potential of wiper 105 hence, so long as the space temperature remains sufficiently high to keep the wiper 105 positive, relay 54 remains in but ineffective. Thus, regardless of the outside temperature, when the relative humidity of the space is high and the contacts of switch 65 are closed, heating and cooling may be provided at the same time. However, this reheat cycle, for that is what it amounts to, is different from that previously described for the compensation for the network is now due to resistor 96 rather than resistors 119 and 120, as previously described. The effect of this is to control the heating of the space on the basis of cooling compensation, thereby requiring variations in space temperature based on outside temperature with the change being in the opposite direction to that previously described, the change to cooling compensation being the function of relay 68. Further, because switch 41 is in the energizing circuit for relay 68, this relay can be pulled in by humidistat 62 only when valve 32 is closed. The continued operation of the refrigerating system obviously tends to reduce the temperature of coil 15 and thereby condense out excess moisture, and the reheating of the air by coil 16 causes a decrease in relative humidity. Upon humidistat 62 being satisfied and the contacts of switch 65 opened, relay 68 is deenergized thus breaking the holding circuit through switch blade 72 and contact 73. Further, blade 71 again engages contact 75 and puts rebalance potentiometer 35 in the circuit with amplifier 45. Because the space temperature and outside temperature are above the temperatures required to give a negative signal on this part of the circuit, the resulting positive signal on wiper 37 and input terminal 48 of the amplifier 45 causes energization of relay 46 and the closing of valve 32 by motor 33. The normal cooling cycle resumes and the refrigerating apparatus is continued in operation until wiper 105 is no longer positive relative to ground at which time the operation of the refrigerating apparatus ceases, as above described.

Figure 2

Figure 2:
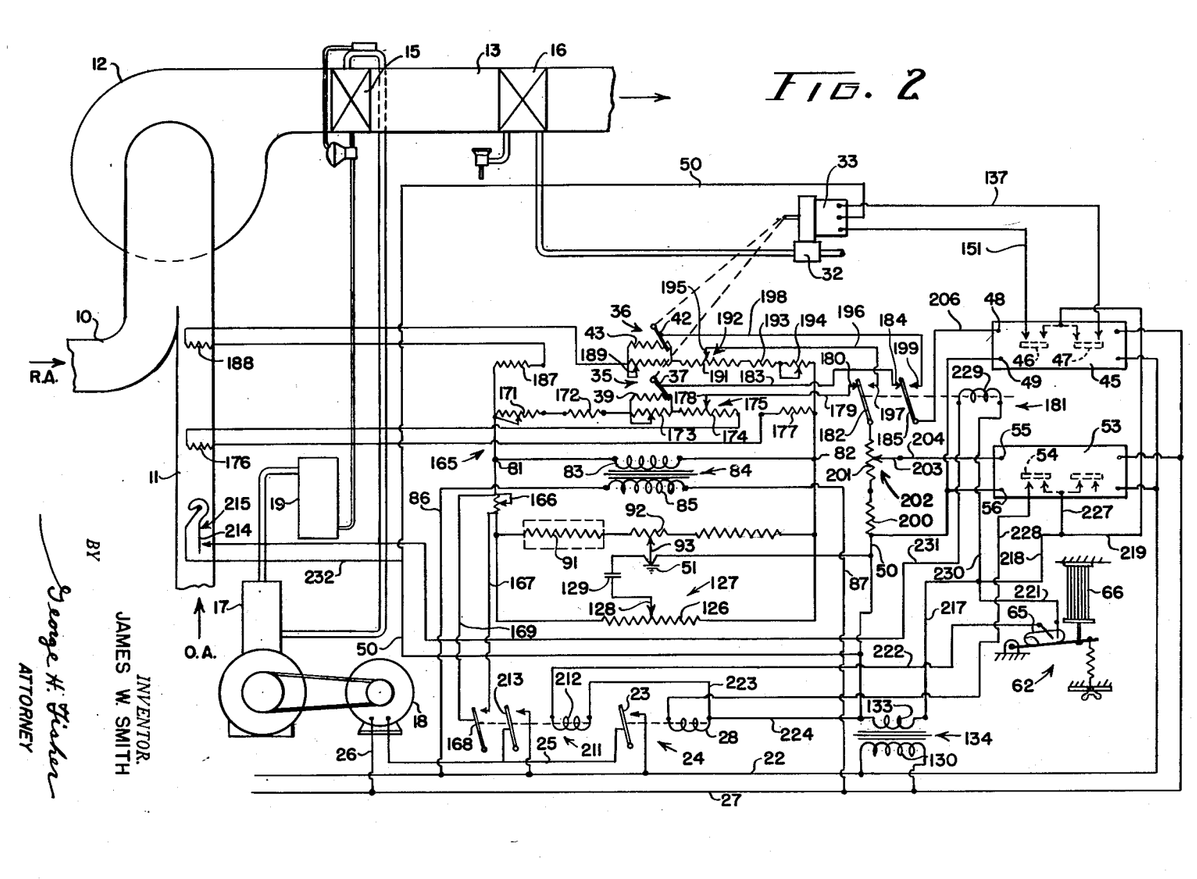
Figure 2 is a schematic representation of a modified form of the present invention.

The air conditioning system shown in Figure 2, including the refrigerating apparatus and steam heating apparatus is similar to that of Figure 1. In addition, the amplifier for controlling the motor valve and the amplifier for controlling the refrigerating apparatus are also similar, as is the humidistat, and like parts have similar numbers. However, in this figure, the network circuit 165 used for controlling the apparatus is different to some extent although the energizing transformer and the lower portion of the network is essentially the same as that of Figure 1 and has been similarly numbered. In this network circuit, a variable resistor 166 is provided between resistor 91 and input terminal 81, and a circuit comprising wires 167, switch 168, and wire 169 is arranged in shunt relation to said resistor so that, when switch 168 is closed, resistance 166 is not effective.

The upper portion of the network comprises a first branch having a variable resistor 171, a fixed resistor 172, a variable resistor 173 in shunt relation to resistor 39 of follow-up potentiometer 35, resistor 174 of potentiometer 175, compensating resistor 176 having a relatively high temperature coefficient of resistance, and fixed resistor 177, this branch being connected across input terminals or sides 81 and 82. Wiper 178 of potentiometer 175 is connected by wire 179 to "out" contact 180 of relay 181 and is arranged to be engaged by switch blade 182 of said relay. Also, wiper 37 of follow-up potentiometer 35 is connected by wire 183 to "out" contact 184 of relay 181 and is engageable by switch blade 185. The upper branch of the network 165 comprises a fixed resistor 187, compensating resistor 188 having a relatively high temperature coefficient of resistance, variable resistor 189 connected in shunt relation to resistor 43 of follow-up potentiometer 36, resistor 191 of potentiometer 192, fixed resistor 193, and variable resistor 194, this branch also being connected in parallel to the previous branches and across input terminals or sides 81 and 82 of network 165. Wiper 195 of potentiometer 192 is connected by wire 196 to "in" contact 197 of relay 181 and wiper 42 of follow-up potentiometer 36 is connected by wire 198 to "in" contact 199 of said relay. Switch blade 182 of relay 181 is connected through resistor 201 of potentiometer 202 and fixed resistor 200 to ground wire 50, wiper 203 of said potentiometer being connected by wire 204 to input terminal 55 of amplifier 53, input terminal 56 of said amplifier being connected to ground through wire 50. Switch blade 185 of relay 181 is connected by wire 206 to input terminal 48 of amplifier 45, input terminal 49 of said amplifier being connected to ground through wire 50. Relay 181 is controlled by switch 214 of thermostat 215 located in duct 11 and therefore responsive to outdoor air temperature. Thermostat 215 is adjusted to close switch 214 at temperatures of 70° and above, for example, and to open said switch at temperatures below 70°. Amplifiers 45 and 53 are energized from line wires 22 and 27, as in the previous example and the primary windings of transformers 84 and 134 are similarly energized from said line wire.

In this example, in addition to relay 24 for controlling the energization of the refrigerating apparatus, an additional relay 211 is provided. This relay comprises a winding 212 and switches 213 and 168 operated thereby, switch 168 being the previously mentioned switch for shunting resistor 166 and switch 213 being connected in parallel to switch 23 for controlling the operation of motor 18. As in the previous example, the operation of this apparatus will now be recited to more fully describe the apparatus and its function.

Operation

Assuming the present apparatus is in operation and in equilibrium with the room temperature at near 70 degrees and an outside temperature sufficiently low to require a small amount of steam through valve 32, and further assuming that the network circuit is adjusted to provide substantially the same compensation as provided previously and that the capacity balance potentiometer 127 has been adjusted for the most optimum null signal when the bridge is balanced, it now appears that the refrigerating apparatus is not operating because switches 23 and 213 are both open and, because the switch 214 of outside air thermostat 215 is open, the system is on a heating cycle and wiper 37 of follow-up potentiometer 35 is connected to input terminal 48 of amplifier 45 through wire 183, "out" contact 184, switch blade 185 and wire 206 to said input terminal. If the outside temperature should now diminish, thereby lowering the resistance of resistor 176, it appears that a signal will be impressed on input terminal 48. With the same phase relation existing in network 165 as discussed previously, and the left side of the network at a positive potential and the right side at a negative potential at the half cycle instant in question, it appears that a decrease in resistance of resistor 176 tends to make wiper 37 negative relative to ground 51, hence a negative signal is impressed on input terminal 48, thereby causing relay 47 to pull in and energize motor 33 by the circuit: secondary winding 133, wire 217, wire 218, wire 219, relay 47, wire 137, motor 33 and wire 50 to ground. This causes operation of motor 33 in a direction to open valve 32 and to drive wipers 37 and 42 of follow-up potentiometer 35 and 36, respectively, to the left across said resistors. As wiper 37 is driven from the left across resistor 43, it becomes less negative relative to ground and the signal is eventually rebalanced, as in the previous example. Likewise, a decrease in room temperature causes wiper 37 to become negative relative to ground and causes a negative potential to be impressed on input terminal 48 thereby causing energization of motor 33 in a direction to drive valve 32 open and cause a further rebalancing by wiper 42.

If now, while on the heating cycle, the relative humidity should rise above the desired value and element 66 elongate and permit closure of the contacts of switch 65, the refrigerating apparatus is then put in operation by the circuit: secondary winding 133, wire 217, wire 221, switch 65, wire 222, winding 212 of relay 211, wire 223, wire 224 and secondary winding 133. Energizing winding 212 closes switches 213 and 168 and, because switch 213 is connected in parallel with switch 23, it causes operation of the refrigerating system, as previously described. Further, closing switch 168 shunts resistor 166, thereby reducing the resistance between resistor 91 and input terminal 81, this having the same effect as reducing the resistance of resistor 91, and acting in a similar fashion to a reduction in space temperature. This calls for additional heating because wiper 37 is thus made more negative relative to ground 51 than it was previously, and due to the higher control point thus established for room temperature responsive resistor 91, additional heat is provided by coil 16 to offset the cooling effect of evaporator 15. As before described, operation of the refrigerating apparatus tends to condense moisture out of the air passing through the coil and the subsequent reheating of the air then reduces the relative humidity.

Assuming the relative humidity now decreases below the set point of humidistat 62, so that the contacts of switch 65 are opened, relay 211 is deenergized and the refrigerating apparatus is stopped. In addition, switch 168 is opened, thereby reestablishing the normal control point for resistor 91.

At the same time that wiper 37 is connected to input terminal 48 of amplifier 45, wiper 178 of potentiometer 175 is connected to the input terminal 55 of amplifier 53 by a circuit previously traced. However, so long as wiper 37 is able to rebalance the network, wiper 178 remains negative relative to ground and, as before mentioned, a negative signal on input terminal 55 of amplifier 53 is unable to cause operation of relay 54. However, if the internal heating load of the structure being treated should vanish and the inside temperature continue to rise, although the outside temperature is still low enough to call for heat, the rise in room temperature causes an increase in resistance of resistor 91 and tends to make wiper 37 positive, and a positive signal impressed on input terminal 48 of amplifier 45 causes relay 46 to energize motor 33 in a direction to close valve 32 by a circuit similar to that of the previous example. However, upon motor 33 completely closing valve 32 and advancing wiper 37 to the extreme right of resistor 39, no further rebalancing of the network can take place, and upon a sufficient increase in room temperature to overcome the potential existing between wiper 37 and wiper 178, wiper 178 then becomes positive relative to ground and a positive signal is impressed on input terminal 55 of amplifier 53, thus causing the energizing of relay 54 of said amplifier. Upon relay 54 on amplifier 53 being energized, the refrigerating apparatus is placed in operation by the circuit: secondary winding 133, wire 217, wire 218, wire 227, relay 54, wire 228, winding 28 of relay 24, wire 224 and secondary winding 133, energizing winding 28 of relay closing switch 23 and operating the refrigerating apparatus, as previously described. Obviously, as the operation of the refrigerating apparatus diminishes room temperature and thereby decreases the resistance of resistor 91, wiper 178 then becomes less positive relative to ground hence, upon the positive signal being wiped out, due to the decrease in resistance of resistor 91, relay 54 is deenergized and relay 24 then drops out, stopping the refrigerating apparatus.

If the outside temperature should now rise above a predetermined value, such as 70 degrees, and switch 214 of thermostat 215 is closed, winding 229 of relay 181 is energized by the circuit: secondary 133, wire 217, wire 230, winding 229, wire 231, switch 214 and wire 232 to ground wire 50. This causes switch blades 182 and 185 to engage "in" contacts 197 and 199 of said relay and shift control of amplifiers 45 and 53 from one branch of the network to the other branch of said network. Thus, wiper 42 of rebalanced potentiometer 35 is connected through wire 198, "in" contact 199, blade 185 and wire 206 to input terminal 48 of amplifier 45, and wiper 195 of potentiometer 192 is connected through wire 196 and "in" contact 197 to blade 182 which is connected to input terminal 55 of amplifier 53, as previously described. This branch of the network is generally similar to that previously described excepting that compensator 188 is in the opposite side of the bridge from compensator 176, hence the resistance of 91 must now be increased more than that of resistance 188 to cause a positive signal to be impressed on input terminal 48. However, assuming that the space temperature does rise without a similar rise in outside temperature, then wiper 42 is positive relative to ground 51. As before noted, a positive signal on wiper 42, and thus on input terminal 48 of amplifier 45 causes an energization of motor 33 in a direction to close valve 32 and to move wiper 42 to its right extreme. However, assuming that wiper 42 is already at its right extreme, a sufficent unbalance of the network, due to a sufficiently high temperature at 91, causes wiper 195 to become positive relative to ground 51 and thereby imposes a positive signal on input terminal 55, by a circuit previously traced. A positive signal on the input of amplifier 53 causes energization of relay 54 and thus causes operation of the refrigerating apparatus, in a manner previously described. The refrigerating apparatus then operates until the room temperature is reduced or until the outside temperature increases the resistance of resistor 188 to thereby tend to make wiper 195 negative relative to ground and drop out relay 54.

While operating on the cooling cycle, an increase in relative humidity causes a closing of switch 65 which thereby causes an energization of winding 212 of relay 211 and a consequent closing of switch 213, but this switch may have no effect in starting the refrigerating apparatus if it is already in operation. However, on the normal cooling cycle, the refrigerating apparatus would be cycled on and off to maintain the space temperature at the desired value. However, with the switch 213 kept closed by humidistat 62, the apparatus continues in operation even though the space temperature tends to be satisfied. However, as the space temperature is lowered, thereby eliminating the positive signal from wiper 195 and dropping out relay 54 of amplifier 53, a further drop in space temperature will cause wiper 42 to become negative and thereby cause energization of motor 33 in a direction to open valve 32 and cause heating by coil 16. The opening of valve 32 is accompanied by movement of wiper 42 to the left across resistor 39 to rebalance the network, as previously described. The continued operation of the refrigerating apparatus and the reheating of the air to maintain space temperature causes a decrease in relative humidity and eventually satisfies humidistat 62, causing an opening of switch 65 and a stopping of the compressor, providing that the space temperature is not calling for cooling.

*Summary*

In the above disclosure, it is shown how an air conditioning apparatus can be controlled on either a heating or cooling sequence with outside compensation in either case and with the compensation in the desired direction and of the amount desired. In addition, the system can be operated on a reheat cycle regardless of whether the normal cycle is heating or cooling, if such a reheat cycle is necessary to correct relative humidity conditions. Also, the capacity effects involved in the complex network described due to unsymmetrical leads and the like are readily balanced by a capacity balance potentiometer and capacitor connected across the input terminals of the network.

The examples given of the present invention are only illustrative and it is obvious that many substitutions and equivalents will appear to one skilled in the art hence the scope of this invention should be determined only by the appended claims.

I claim:

1. In control apparatus for an air conditioning system, an electrical network circuit having a plurality of parallel branches, input connections for said network circuit, one of said parallel branches including a first temperature responsive impedance having a relatively high impedance value and a first output connection, another of said branches including a compensating second temperature responsive impedance and a plurality of other output connections, said connections being between said second impedance and one of said input connections, said second impedance having an impedance value less than that said first impedance, an additional branch of said network circuit including a compensating third temperature responsive impedance and an additional output connection, said third impedance also having an impedance value less than that of said first impedance and being connected in the circuit to compensate in a different manner than does said second impedance, a heating control device, switching means operated by said heating control device, a cooling control device, amplifier means for controlling said devices, electric circuit means including a relay for connecting said other or additional output connections of one or the other of said parallel branches in controlling relation to said amplifier means, said first output connection also being connected to said amplifier means and being common to said network circuit, humidity responsive means, and means connecting said humidity responsive means and said switching means in controlling relation to said relay means.

2. In control apparatus for an air conditioning system, in combination, an alternating current electrical network circuit, input connections for said circuit, said circuit having a plurality of parallel branches, one of said branches including a first condition responsive impedance, said one branch including an output connection common to the network as a whole, another of said branches including another output connection and a second condition responsive impedance, said second impedance being arranged to act as a compensator for the first impedance, an additional branch of said network circuit including an additional output connection and a third condition responsive impedance for compensating said first impedance, said third impedance being arranged on a side of said additional output connection opposite to the arrangement of the other output connection and said second impedance, one of said impedances being appreciably more distant from the input connections than another of said impedances, a further parallel branch including a high resistance resistor having an adjustable intermediate connection, a capacitor, means connecting said capacitor in series with said intermediate connection and said common output connection, and amplifier means controlled by the common and said other and said additional output connections.

3. In control apparatus for an air conditioning system having both heating and cooling equipment, in combination, an electrical network circuit, said circuit having a plurality of parallel branches, input connections for said circuit, one of said branches including a first condition responsive impedance, said one branch including an output connection common to the network circuit, another of said branches including another output connection and a second condition responsive impedance, said second impedance being arranged to act as a compensator to the first impedance, an additional branch of said network circuit including an additional output connection and a third condition responsive impedance for compensating said first impedance, said third impedance being arranged on a side of said additional output connection opposite to the arrangement of said second impedance and said other output connection to thereby compensate the first condition responsive impedance in a direction opposite that of the second condition responsive impedance, an amplifier means capable of controlling heating equipment, another amplifier means capable of controlling cooling equipment, means connecting said common output connection to both of said amplifier means, and means connecting said second and third output connections to said heating and cooling amplifier means respectively.

4. In control apparatus for an air conditioning system, in combination, an electrical network circuit, input means for said circuit, said circuit having a plurality of parallel branches, one of said branches including a first condition responsive impedance, said one branch including an output connection common to said circuit, another of said branches including another output connection and a second condition responsive impedance, said second impedance being arranged to act as a compensator for the first impedance and having a lower impedance value than said first impedance, an additional branch of said network circuit including an additional output connection and a third condition responsive impedance for compensating said first impedance, said third impedance also having a lower impedance value than said first impedance value and being arranged on a side of said additional output connection opposite to the arrangement of the other output connection and said second impedance to thereby compensate said first impedance in a direction reverse to that of the second impedance, separate amplifier means individually controlled by the common and said other and said additional output connections, a heat control device controlled by one of said amplifier means, and a cooling control device controlled by another of said amplifier means.

5. In control apparatus for means for changing a condition in opposite directions, in combination, an electrical network circuit having more than two output connections, input means for said circuit, said circuit having a plurality of parallel branches, one of said branches including a first condition responsive impedance, said one branch including one of said output connections used as a common output connection, another of said branches including another of said output connections and a second condition responsive impedance, said second impedance being arranged to act as a compensator for the first impedance, an additional branch of said network circuit including an additional one of said output connections and a third condition responsive impedance for compensating said first impedance, said third impedance being arranged to compensate said first impedance differently than does said second impedance, an amplifier means capable of controlling condition changing means of one sort, additional amplifier means capable of controlling condition changing means of a different sort, means connecting said common output connection to both of said amplifier means, and means connecting said second and third output connections to said respective amplifier.

6. In control apparatus for an air conditioning system, an electrical network circuit having a plurality of parallel branches and at least three output connections, input connections for said network circuit, one of said parallel branches including a first condition responsive impedance and one of said output connections used as a common output connection, another of said branches including a compensating second temperature responsive impedance and a plurality of said output connections, said connections being between said second impedance and one of said input connections, an additional branch of said network circuit including a compensating third temperature responsive impedance and an additional one of said output connections, said third impedance being arranged in said branch to compensate said first impedance in a different manner than does said second impedance, a heating control device, a cooling control device, separate amplifier means for controlling each of said devices, electric circuit means connecting said common output connection to both of said amplifier means, means connecting one of the output connections of said second branch to one of said amplifier means and the other output connection of said second branch to the other amplifier means, and means capable of connecting the output connection of said third branch to one of said amplifier means.

7. In control apparatus for an air conditioning system, an electrical network circuit having a plurality of parallel branches and more than two output connections, input connections for said network circuit, one of said parallel branches including a first temperature responsive impedance and one of said output connections used as a common output connection, another of said branches including a compensating second temperature responsive impedance and a plurality of said output connections, said connections being between said second impedance and one of said input connections, an additional branch of said network including a compensating third temperature responsive impedance and an additional one of said output connections, said third impedance being connected in the network in a manner to modify the influence of said first impedance in a different manner than does said second impedance, a heating control device, switch means operable by said heating control device, a cooling controlling device, separate amplifier means for controlling each of said devices, circuit means for connecting said common output connection to both of said amplifier means, means connecting the output connections of said second and third branches to control both of said amplifier means, and relay means controlled by said switch means for shifting control of one of said amplifier means from one output connection to another output connection.

8. In control apparatus for an air conditioning system, an electrical network circuit having a plurality of parallel branches and more than two output connections, input connections for said network circuit, one of said parallel branches including a first temperature responsive impedance and one of said output connections used as a common output connection, another of said branches including a compensating second temperature responsive impedance and a plurality of said output connections, said connections being between said second impedance and one of said input connections, an additional branch of said network circuit including a compensating third temperature responsive impedance and an additional one of said output connection, said third impedance being connected in its branch in a manner to modify the influence of said first impedance in a different manner than does said second impedance, a heating control device, a cooling controlling device, a plurality of amplifier means for individually controlling said devices, electric circuit means connecting said output connections in controlling relation to said amplifier means, and humidity responsive means for controlling an electric connection in shunt relation to one of said amplifier means for directly controlling a cooling controlling device.

9. In control apparatus for an air conditioning system, an electrical network circuit having a plurality of branches and more than two output connections, input connections for said network circuits, one of said branches including a first temperature responsive impedance and one of said output connections used as a common output connection, another of said branches including a compensating second temperature responsive impedance and a plurality of said output connections, said connections being between said second impedance and one of said input connections, an additional branch of said network circuit including a compensating third temperature responsive impedance and an additional one of said output connections, said third impedance being constructed and arranged to compensate said first impedance in a different manner than does said second impedance, a heating control device, a cooling controlling device, amplifier means for controlling said devices, electric circuit means connecting said output connections in controlling relation to said amplifier means, and temperature responsive means exposed to outside air for controlling said electric circuit means in a manner to shift control of at least part of said amplifier means from the output connections of one of said branches to the other.

10. In control apparatus, an electrical network circuit having a plurality of parallel branches and more than two output connections, input connections for said network circuit, one of said branches including a first temperature responsive impedance and one of said output connections used as a common output connection, another of said branches including a compensating second temperature responsive impedance and a plurality of said output connections arranged in electrically spaced relation to each other, an additional branch of said network circuit including a compensating third temperature responsive impedance and a plurality of said output connections also arranged in electrically spaced relation to each other, said third impedance being arranged to compensate said first impedance in a reverse manner than said second impedance, a heating control device, a cooling control device, separate amplifier means connected in controlling relation to each of said devices, electrical circuit means including a relay for connecting the output connections of either the other or the additional branch in controlling relation to the separate amplifier means to thereby alter the sequence of control to be effected by the present apparatus, and means responsive to the same temperature as one of said second or third impedances for controlling said relay.

11. In control apparatus, an alternating current electrical network circuit having a plurality of parallel branches and more than two output connections, input connections for said network circuit, one of said branches including a first condition responsive impedance and one of said output connections used as a common output connection, another of said branches including a compensating second condition responsive impedance and a plurality of said output connections, an additional branch of said network circuit including a compensating third condition responsive impedance and a plurality of said output connections, said third impedance being arranged to compensate said first impedance in a different manner than said second impedance, a further branch including the resistor of a potentiometer, a capacitor, means connecting the wiper of said potentiometer and said capacitor in series with said common output connection, a heating control device, a cooling control device, separate amplifier means connected in controlling relation to each of said devices, electric circuit means including a relay for connecting the output connection of either the other or the additional branch in controlling relation to the separate amplifiers to thereby control said amplifier in a sequence depending on which network branch is used, and means responsive to the same condition as one of said second or third impedances for controlling said relay.

12. In control apparatus, an electrical network circuit having a plurality of parallel branches and having a plurality of output connections, input connections for said network circuit, one of said branches including a first condition responsive impedance and one of said output connections used as a common output connection, another of said branches including a compensating second condition responsive impedance and a plurality of said output connections, an additional branch of said network circuit including a compensating third condition responsive impedance and a further plurality of said output connections, said third impedance being arranged to compensate said first impedance in a different manner than said second impedance, a heating control device, a cooling control device, amplifier means for controlling said devices, electrical circuit means including a relay for connecting the output connections of either the other or the additional branch in controlling relation to said amplifier means to thereby alter the sequence of control to be effected, means responsive to the same condition as one of said second or third impedances for controlling said relay, and humidity responsive means for independently controlling said cooling control device.

13. In control apparatus for an air conditioning system having heating means and cooling means, means including a network circuit having a plurality of parallel branches for controlling said heating means and said cooling means, one of said parallel branches having an output connection for said cooling means and another of said branches having an output connection for said heating means, relay means operable to connect said means including a network circuit to said heating means in a manner to cause normal operation of the heating means when there is a heating load and operable to connect said means including the network circuit to said cooling means in a manner to cause normal operation of the cooling system when there is a cooling load, additional relay means, humidity responsive means for operating said additional relay means, and means connecting said additional relay means to said control apparatus in a manner to cause simultaneous operation of said heating means and said cooling means when the relative humidity affecting said humidity responsive means reaches a predetermined value.

14. In control apparatus for an air conditioning system having heating means and cooling means including an electrical impedance means responsive to the temperature of the space being treated, a device responsive to the relative humidity in said space, switch means operable by said humidity responsive device, means including a network circuit for controlling said heating means and said cooling means, said circuit including said impedance means and at least a pair of electrical potential spaced output connections and another output connection used with either or both of the first named output connections, said means including said network circuit and its output connections being connected to normally control said heating means and said cooling means in sequence, means connecting said switch means to said means including said network circuit and its output connections in such manner that said cooling means and said heating means are operated simultaneously when said humidity responsive means responds to a predetermined value of humidity.

15. In air conditioning control apparatus, a device for controlling heating and a device for controlling cooling, impedance means responsive to the temperature of the space being conditioned, a plurality of impedance means responsive to the temperature of the air supplied to said air conditioning apparatus, relay means for controlling said heating control device and said cooling control device, and a network circuit having a plurality of parallel branches, one of said branches being connected to an output connection designated a common output connection, separate output connections for each of the other of said branches, said one branch including said space temperature responsive means, one of said other parallel branches including one of said supply air temperature responsive means and an output connection connected to said relay means for controlling said heating control device, said supply air temperature responsive device being arranged in said network circuit in a manner to compensate said circuit in a manner tending to require an increased spaced temperature as the air supply temperature decreases, and another one of said other said parallel branches including another of said supply air temperature responsive means and an output connection connected to said relay means for controlling said cooling control device, the last named supply temperature responsive means being arranged in said network circuit in a manner to compensate said network in a manner tending to require an increased space temperature as said supply air temperature increases, said common output connection being used with either of the separate output connections.

16. In control apparatus, a balanceable electrical network circuit having a common output connection and a plurality of other output connections, a corresponding plurality of control devices each connected to one of said other output connections and to said common connection, an alternating current source for said network circuit, and a capacity balance means for said network comprising a potentiometer and a capacitor, said potentiometer including a resistor connected to said current source in shunt relation with said network and the wiper of said potentiometer and said capacitor connected in series with said common connection.

17. In control apparatus, a balanceable electrical network circuit having a common output connection and a plurality of other output connections, a pair of input terminals for said network arranged to be connected to a suitable source of alternating current electricity, and a capacity balance means comprising a potentiometer and a capacitor, the resistor of said potentiometer being connected across said input terminals and the wiper of said potentiometer being connected through said capacitor to said common connection.

18. In control apparatus for air conditioning apparatus including a heating means and a cooling means, relay means for controlling said heating means, another relay means for controlling the cooling means, and means including a network circuit for controlling both of said relay means, said network circuit including a pair of output connections arranged in the circuit to be at different electrical potentials, said network circuit also having another output connection, one of said pair of output connections and said other output connection being connected in controlling relation to the relay means for said heating means and the other of said pair of output connections and said other output connection being connected in controlling relation to the relay means for said cooling means.

JAMES W. SMITH.

REFERENCES CITED

The following references are of record in the file of this patent:

UNITED STATES PATENTS

| Number | Name | Date |
|---|---|---|
| 2,144,105 | Coleman | Jan. 17, 1939 |
| 2,266,029 | Haines | Dec. 16, 1941 |
| 2,282,442 | Whitlock | May 12, 1942 |
| 2,298,847 | Smith | Oct. 13, 1942 |
| 2,346,592 | Lehane et al. | Apr. 11, 1944 |
| 2,362,977 | Crosthwait et al. | Nov. 21, 1944 |
| 2,372,839 | McGrath | Apr. 3, 1945 |
| 2,375,988 | Gille et al. | May 15, 1945 |
| 2,457,165 | McNamee | Dec. 28, 1948 |
| 2,462,599 | Blumlein et al. | Feb. 22, 1949 |
| 2,486,908 | Andersson | Nov. 1, 1949 |

FOREIGN PATENTS

| Number | Country | Date |
|---|---|---|
| 527,349 | Great Britain | Oct. 7, 1940 |